United States Patent Office 3,113,425
Patented Dec. 10, 1963

3,113,425
ORTHO-SUBSTITUTED BICYCLOHEXYL HYDROCARBONS AS HIGH ENERGY FUELS
John O. Smith, Swampscott, and K. Warren Easley, Wayland, Mass., assignors, by mesne assignments, to Monsanto Research Corporation, Everett, Mass., a corporation of Delaware
No Drawing. Filed Oct. 1, 1960, Ser. No. 63,473
6 Claims. (Cl. 60—35.4)

This invention relates to high energy fuels. More particularly, this invention relates to methods of developing thrust and to methods of operating reaction type power plants. This invention especially contemplates a high energy fuel composition comprising an ortho-substituted bicyclohexyl hydrocarbon as an essential ingredient.

The development of reaction type power plants has been accompanied by the requirement for developing fuels suitable for use in such engines. In a reaction type power plant, fuels and an oxidizing agent are admixed under suitable conditions and in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to produce thrust in accordance with the law of momentum. In a jet propulsion type engine, such as a rocket, ram-jet, turbo-jet, or pulse-jet engine, exhaustion of the high temperature gases is directed in a rearward direction to produce a true jet propulsion. In a turbine type engine, such as a gas turbine or a turbo-prop engine, the exhaustion of high temperature gases is directed into a turbine which drives a propeller or other mechanical means for developing a forward thrust. Reaction type power plants may be used in widely different types of vehicles such as, in space-ships, aircraft, boats, guided missiles, automobiles, and the like.

Heretofore, it was believed that many hydrocarbons did not vary sufficiently in their burning characteristics to make a material difference in the operation of reaction type power plants. Although these power plants may be operated under many conditions with substantially any fuel, other conditions of operation encounter operational difficulties and require fuels having particular properties. One difficulty which has been encountered in power plants for high speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP–4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft generally, and particularly military aircraft, are being designed for higher and higher speeds requiring higher energy level fuels. The fuel must not only have a high energy level on a weight basis, or high B.t.u./lb., but also a high energy level on a volume basis or high B.t.u./gal., since wing sections are being made thinner in order to remove drag and space for storage of fuel is limited. Thus, aircraft are often volume limited as well as weight limited for the storage of fuel. Aircraft are particularly volume limited using the currently available JP–6 high energy fuel which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide high energy fuel compositions for use in reaction type power plants.
Another object of this invention is to provide improved methods of developing thrust.
Another object of this invention is to provide improved methods of operating reaction type power plants, particularly jet propulsion type engines, including rocket, ram-jet, turbo-jet, and pulse-jet engines, and turbine type engines, including turbo-prop and gas turbine engines.
Other aspects, objects and advantages of this invention will be apparent from a consideration of the accompanying disclosure and the appended claims.

According to the present invention, there are provided high energy fuel compositions comprising, as an essential ingredient, an ortho-substituted bicyclohexyl hydrocarbon, preferably an ortho-substituted bicyclohexyl hydrocarbon of the formula

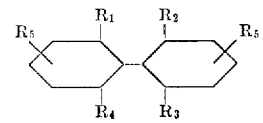

wherein $R_1$, $R_2$, $R_3$ and $R_4$ are alkyl radicals, and $R_5$ is selected from the group consisting of hydrogen or alkyl radicals.

Also, according to the present invention, there are provided improved methods of developing thrust, said methods comprising oxidizing a high energy fuel composition comprising, as an essential ingredient, an ortho-substituted bicyclohexyl hydrocarbon, preferably an ortho-substituted bicyclohexyl hydrocarbon as defined above, with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, an ortho-substituted bicyclohexyl hydrocarbon, preferably an ortho-substituted bicyclohexyl hydrocarbon as defined above, into the combustion chamber of said reaction type power plants in such proportion as to produce a combustible mixture, subjecting said combustible mixture to combustion, and exhausting the resulting gases from said combustion chamber so as to impart thrust thereto.

Preferably, the ortho-substituted bicyclohexyl hydrocarbon components of the high energy fuel compositions of this invention are substituted with alkyl groups having from 1 to 4 carbon atoms in each group. These alkyl groups can be either straight-chain or branched-chain. The ortho-substituted bicyclohexyl hydrocarbons of this invention are also preferably substituted with alkyl groups in either the meta- or para-positions and these alkyl groups preferably contain from 1 to 4 carbon atoms. As between the meta and para substitutions, the para substitution is preferred.

Examples of some suitable 2,6,2',6'-tetraalkylbicyclohexyl hydrocarbons of this invention include the following:

2,6,2',6'-tetramethylbicyclohexyl
2,6,2',6'-tetraethylbicyclohexyl
2,6,2',6'-tetraisopropylbicyclohexyl
2,6,2',6'-tetra-tert-butylbicyclohexyl Examples of some suitable 2,4,6,2',4',6'-hexaalkylbicyclohexyl hydrocarbons of this invention include the following:

2,4,6,2',4',6'-hexamethylbicyclohexyl
2,4,6,2',4',6'-hexaethylbicyclohexyl
2,4,6,2',4',6'-hexaisopropylbicyclohexyl
2,4,6,2',4',6'-hexabutylbicyclohexyl
2,4,6,2',4',6'-hexa-tert-butylbicyclohexyl The ortho-substituted bicyclohexyl hydrocarbons of this invention may be prepared from a halogenated di- or trialkyl benzene in a 2-step process wherein the halogenated di- or trialkyl benzene is coupled with itself to form a tetra- or hexaalkyl diphenyl which is then hydrogenated to form the ortho-substituted bicyclohexyl. The first reaction is carried out using a Grignard reagent coupled with an anhydrous group VIII metal halide, for example, cobaltous chloride, at a low temperature, usually below −20° C. The hydrogenation reaction is preferably carried out in the presence of a nickel catalyst at an elevated temperature, usually in the range of from 100 to 200 atmospheres, and at an elevated temperature, usually in the range of 150° C. to 250° C., using a paraffinic hydrocarbon solvent. Ortho-substituted bicyclohexyl hydrocarbons prepared in this manner are particularly useful in the practice of this invention; however, other methods are known and can be used for preparing these hydrocarbons for use in this invention.

The advantages, desirability and usefulness of the present invention are illustrated by the following examples.

EXAMPLE 1

In this example, 2,4,6,2',4',6'-hexamethylbicyclohexyl was prepared from 2-bromo-1,3,5-trimethyl benzene. A Grignard reagent for use in the first step was prepared by treating 24.3 g. (1 mole) of magnesium and 400 ml. of anhydrous diethyl ether with 199 g. (1 mole) of 2-bromo-1,3,5-trimethyl benzene in 200 ml. of anhydrous diethyl ether. Anhydrous cobaltous chloride for use in this reaction step was prepared by heating the hexahydrate to 150° C. for 24 hours in an open dish and just before use, heating to a temperature of 150° C. for one hour and cooling in vacuo. The Grignard reagent was heated under reflux for 30 minutes before use and then cooled to −60° C. in an acetone-Dry Ice bath. At this time, 130 g. (1 mole) of the anhydrous cobaltous chloride was added in three portions while stirring vigorously. Before each addition, the reaction mixture was allowed to warm to about −20° C. After the addition of the cobaltous chloride was complete, the reaction mixture was heated under reflux for 4 hours and left to stand overnight. At this time, hydrolysis of the reaction mixture was effected with saturated ammonium chloride solution. The mixture was then filtered and the organic layer separated, washed and dried over anhydrous magnesium sulfate. This material was then distilled under reduced pressure to obtain 24 g. of bimesityl boiling at 140-180° C./13.5 mm. This material was further purified by redistillation from sodium and recrystallized from ethanol.

In the hydrogenation step, 43 g. of bimesityl was dissolved in 50 ml. of hexane and hydrogenated in a 330 ml. bomb placed in a rocking autoclave. The bomb also contained 5 g. of nickel-on-kieselguhr catalyst. Upon first heating the material to 250° C. at a hydrogen pressure of 1650 p.s.i., no reduction occurred so the material was removed from the bomb, filtered and distilled at reduced pressure from 0.5 g. of sodium. This entire process was repeated several times before the reduction was effected. The reduction was eventually completed at 300° C. at which temperature uptake of hydrogen was still very slow. The progress of the reaction was followed by ultra-violet absorption spectroscopy on the material after each attempted reduction. Final purification of the product was accomplished through a 3″ x ½″ column of silica gel to obtain 26 g. of the 2,4,6,2',4',6'-hexamethylbicyclohexyl having a boiling point of 150–155° C./12 mm. Analysis of this product was found to be 86.4% carbon and 13.6% hydrogen as compared with calculated values of 86.3% carbon and 13.7% hydrogen. The proposed structure of this compound was confirmed by inspection of the infrared spectrum of the product.

EXAMPLE 2

In this example, 2,4,6,2',4',6'-hexamethylbicyclohexyl was subjected to inspection tests in order to show from the thermal and physical properties that this compound is suitable for use in the operation of reaction type power plants. The results of these tests are given in Table I.

*Table I*

THERMAL AND PHYSICAL PROPERTIES OF 2,4,6,2',4',6'-HEXAMETHYLBICYCLOHEXYL FUEL

| | |
|---|---|
| Hydrogen/carbon ratio | 0.159 |
| Freezing point, ° F | −50 |
| Index of refraction, $n_D^{25}$ | 1.4806 |
| Boiling point, ° C | 150–155° C./12 mm. |
| Density at 99° C., g./ml | 0.835 |
| Heat of combustion, B.t.u./lb., net | 18,546 |
| Heat of combustion, B.t.u./gal., net | 137,604 |
| Viscosity at 99° C., cs | 2.3 |
| Thermal conductivity, B.t.u./hr.-ft.$^2$, ° F/ft.: | |
| At 145.4° F | 0.0570 |
| At 219.2° F | 0.0558 |
| At 316.4° F | 0.539 |
| Thermal decomposition temp., ° F | 664 |

Heats of combustion were obtained with a Parr oxygen bomb calorimeter on both a weight and a volume basis following the ASTM D–240–57T procedure. The freezing point was determined using the ASTM D–1477–57T procedure. Thermal conductivities were measured by the hot-wire method described by Cecil and Munch in Ind. Eng. Chem. 48, 437 (1956) and Cecil, Koerner and Munch in Ind. Eng. Chem. Data Sheets, 2, 54 (1957). Density was determined at a temperature of 99° C. using a Lipkin bicapillary pycnometer. Viscosity at 99° C. was measured using the standard Cannon Fenske capillary viscosimeter following the ASTM D–445 procedure.

The thermal decomposition temperature was obtained using a high temperature, high pressure isoteniscope which consists of a Monel bomb capped at one end and connected to a precision pressure gauge by a Monel diaphragm. The test fuel was heated within the bomb to an elevated temperature under high pressure and the temperature measured at which the fuel began to decompose and evolve gas as determined by the changes of pressure within the bomb. In this method, the formation of deposits in the decomposition reaction is not measured because some fuels may start to decompose to gas before forming deposits.

The above examples indicate that the ortho-substituted bicyclohexyl hydrocarbons are very suitable for use in various reaction type power plants. These particular compounds have very high heats of combustion on both a weight basis and a volume basis and may therefore be very advantageously employed in jet propulsion type engines and turbine type engines where extremely high energy content fuels are desired on either a weight basis or a volume basis. Another advantage in using these compounds in reaction type power plant fuel compositions is the fact that these compounds have a very low freezing point and, therefore, can be handled satisfactorily at low temperatures.

The ortho-substituted bicyclohexyl hydrocarbons of this invention are also characterized by unusually high thermal stabilities when employed as fuels for reaction type power plants. This factor is of importance not only in the actual combustion taking place in the engine but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuels of this invention, the fuel and an oxidizing agent are admixed together to form a combustible mixture which has been ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed either by a mechanical compressor or aerodynamically. Also, in automotive and in ship applications, the oxidizing agent will ordinarily be air. In contrast to these applications, the oxidizing agent will usually be liquid oxygen or another chemical oxidizer, for example, fuming nitric acid, hydrogen peroxide, fluorine or the like in guided missile and rocket applications. In some applications, a mixture of oxidizing agents will also be useful.

The fuel compositions of the present invention may be blended with other materials such as gasoline, kerosene, mixtures of gasoline and kerosene, other aviation fuels, and with the presently available jet fuels to produce an improved fuel composition. More particularly, the fuel described herein may be added to the present aliphatic hydrocarbon fuels having a heat of combustion of about 112,000 B.t.u./gal. to raise the overall heat of combustion thereof to at least about 120,000 B.t.u./gal. Moreover, the fuels described herein may be used in combination with fuel additives to improve various characteristics of the fuel, including liquid viscosity, burning characteristics and the like.

In the operation of reaction type power plants, using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.51. The particular fuel-air ratio used will be dependent not only upon the requirements at the moment but also upon the nature of the engine. Thus, the turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing ortho-substituted bicyclohexyl hydrocarbons as essential ingredients, (2) improved methods of developing thrust, and (3) methods of operating reaction type power plants.

We claim:

1. The method of developing thrust in a reaction chamber, which comprises oxidizing in said chamber a hydrocarbon fuel comprising essentially 2,4,6,2',4',6'-hexaalkylbicyclohexyl wherein alkyl has from 1 to 4 carbon atoms, to produce a mass of high temperature gases and exhausting said gases from said reaction chamber in a manner so as to develop high thrust.

2. The method of operating a jet-propulsion type engine which comprises injecting into the combustion chamber of said engine a stream of an oxidizing agent and a stream of a hydrocarbon fuel comprising essentially 2,4,6,2',4',6'-hexaalkylbicyclohexyl wherein alkyl has from 1 to 4 carbon atoms, oxidizing said fuel in said chamber, and exhausting the resulting gases from said combustion chamber so as to impart thrust.

3. The method of operating a jet-gas turbine engine which comprises injecting into the combustion chamber of said engine a stream of an oxidizing agent and a stream of a hydrocarbon fuel comprising essentially 2,4,6,2',4',6'-hexaalkylbicyclohexyl wherein alkyl has from 1 to 4 carbon atoms, oxidizing said fuel in said chamber, and exhausting the resulting gases from said chamber through a turbine to develop motive power.

4. The method of operating a turbo-jet engine which comprises injecting into the combustion chamber of said engine a stream of air and a stream of a hydrocarbon fuel comprising essentially 2,4,6,2',4',6'-hexaalkylcyclohexyl wherein alkyl has from 1 to 4 carbon atoms, burning said fuel in said chamber, exhausting the resulting gases from said combustion chamber through a turbine to expand the same and compress the air supplied to said chamber, and passing the resulting gases into the atmosphere by way of a nozzle to impart thrust to said engine.

5. The method of operating a turbo-jet engine which comprises injecting into the combustion chamber of said engine a stream of air and a stream of 2,4,6,2',4',6'-hexaalkylbicyclohexyl wherein alkyl has from 1 to 4 carbon atoms, effecting combustion in said chamber, exhausting the resulting gases from said combustion chamber through a turbine to expand the same and compress the air supplied to said chamber, and passing the resulting gases into the atmosphere by way of a nozzle to impart thrust to said engine.

6. The method of operating a turbo-jet engine which comprises injecting into the combustion chamber of said engine a stream of air and a stream of 2,4,6,2',4',6'-hexamethylbicyclohexyl, effecting combustion in said chamber, exhausting the resulting gases from said combustion chamber through a turbine to expand the same and compress the air supplied to said chamber, and passing the resulting gases into the atmosphere by way of a nozzle to impart thrust to said engine.

References Cited in the file of this patent

UNITED STATES PATENTS

| | | |
|---|---|---|
| 2,331,596 | Campbell | Oct. 12, 1943 |
| 2,514,546 | Ipatieff et al. | July 11, 1950 |
| 2,765,617 | Gluesenkamp et al. | Oct. 9, 1956 |
| 2,826,037 | Scott et al. | Mar. 11, 1958 |
| 3,058,300 | Kosmin | Oct. 16, 1962 |

OTHER REFERENCES

Goodman and Wise: Correlation of Physical Properties With Molecular Structure for Dicyclic Hydrocarbons, National Advisory Committee for Aeronautics, Technical Note 2419 (1951), pages 1–21.

UNITED STATES PATENT OFFICE
CERTIFICATE OF CORRECTION

Patent No. 3,113,425                      December 10, 1963

John O. Smith et al.

It is hereby certified that error appears in the above numbered patent requiring correction and that the said Letters Patent should read as corrected below.

Column 3, line 45, for "is" read -- in --; column 6, line 26, for "2,4,6,2',4',6'-hexaalkylcyclo-" read -- 2,4,6,2',4',6'-hexaalkylbicyclo- --.

Signed and sealed this 14th day of September 1965.

(SEAL)
Attest:

ERNEST W. SWIDER                      EDWARD J. BRENNER
Attesting Officer                       Commissioner of Patents